United States Patent
Sanderson et al.

(10) Patent No.: US 6,861,501 B1
(45) Date of Patent: Mar. 1, 2005

(54) PROCESS FOR MAKING STABLE CURED POLY(GLYCIDYL NITRATE) AND ENERGETIC COMPOSITIONS COMPRISING SAME

(75) Inventors: Andrew J. Sanderson, North Ogden, UT (US); Laura J. Martins, Ogden, UT (US); Michael A. Dewey, Plain City, UT (US)

(73) Assignee: Alliant Techsystems Inc., Edina, MN (US)

( * ) Notice: Subject to any disclaimer, the term of this patent is extended or adjusted under 35 U.S.C. 154(b) by 299 days.

(21) Appl. No.: 10/055,725

(22) Filed: Jan. 22, 2002

(51) Int. Cl.[7] .................. C08G 65/10; C07D 303/22; C07D 303/36
(52) U.S. Cl. .................. 528/420; 528/403; 528/408; 525/406; 525/410; 549/551; 549/555; 549/560
(58) Field of Search ..................... 528/420, 403, 528/408; 525/406, 410; 549/551, 555, 560

(56) References Cited

U.S. PATENT DOCUMENTS

| | | | |
|---|---|---|---|
| 5,120,827 A * | 6/1992 | Willer et al. | 528/408 |
| 5,136,062 A | 8/1992 | Millar et al. | 549/513 |
| 5,264,596 A | 11/1993 | Willer et al. | 549/555 |
| 5,380,777 A | 1/1995 | Willer et al. | 524/186 |
| 5,587,553 A | 12/1996 | Braithwaite et al. | 149/19.6 |
| 5,591,936 A | 1/1997 | Willer et al. | 149/19.6 |
| 5,690,868 A | 11/1997 | Strauss et al. | 264/3.1 |
| 5,798,480 A | 8/1998 | Willer et al. | 149/19.4 |
| 5,801,325 A | 9/1998 | Willer et al. | 149/19.4 |
| 6,100,375 A | 8/2000 | Wardle et al. | 528/486 |
| 6,340,175 B1 | 1/2002 | Hughes et al. | 280/741 |
| 6,362,311 B1 | 3/2002 | Highsmith et al. | 528/409 |
| 6,479,614 B1 * | 11/2002 | Ampleman et al. | 528/78 |
| 6,508,894 B1 * | 1/2003 | Beaupreet al. | 149/19.4 |
| 6,600,002 B2 | 7/2003 | Sanderson et al. | 528/78 |

* cited by examiner

Primary Examiner—Ba K. Trinh
(74) Attorney, Agent, or Firm—TraskBritt

(57) ABSTRACT

A process is provided in which at least one multi-functional alcohol having a hydroxyl functionality of at least two serves as a polymerization initiator. The multi-functional alcohol initiator is optionally, although preferably, reacted with a catalyst to form a catalyst-initiator complex, which is then used in the polymerization of glycidyl nitrate. The resulting poly(glycidyl nitrate) has a functionality substantially equivalent in number to the hydroxyl functionality of the multi-functional alcohol initiator. The poly(glycidyl nitrate) is cross-linked with at least one aromatic polyisocyanate having at least one aromatic ring and, on average, more than two isocyanate moieties bonded directly to the aromatic ring.

42 Claims, No Drawings

US 6,861,501 B1

PROCESS FOR MAKING STABLE CURED POLY(GLYCIDYL NITRATE) AND ENERGETIC COMPOSITIONS COMPRISING SAME

GOVERNMENT LICENSING CLAUSE

The U.S. Government has a paid-up license in this invention and the right in limited circumstances to require the patent owner to license others on reasonable terms as provided for by the terms of contract F04611-99-C-0010 awarded by the Air Force.

BACKGROUND OF THE INVENTION

1. Field of the Invention

This invention relates to a method for making cured poly(glycidyl nitrate) having high stability against de-cure. This invention also relates to the production of solid energetic compositions, such as propellants, explosives, pyrotechnics, and gas generants, comprising poly(glycidyl nitrate) binders.

2. Description of the Related Art

Solid high energy compositions, such as propellant, explosives, pyrotechnics, and gasifiers, or the like, generally comprise solid particulates, such as fuel particles and/or oxidizer particles, dispersed and immobilized in a cured binder matrix.

In recent years, energetic polymers have been developed and evaluated as replacements for inert polymeric binders in cast propellant systems, explosives compositions, and pyrotechnics. The substitution of an energetic polymer for an inert polymer in a typical pressable or extrudable explosive composition generally increases the detonation pressure and detonation velocity of the explosive.

Poly(glycidyl nitrate) (also known as "PGN" and "polyGLYN") has been known and recognized for years as a possible energetic polymer suitable for use in propellants, explosives, gas generants, pyrotechnics, and the like. PGN is commonly synthesized in the industry by preparing a difunctional glycidyl nitrate polymer, and curing the PGN with a polyfunctional isocyanate having a functionality of greater than about 2.3 to give urethane cross-linked polymers. Aliphatic polyisocyanates have been selected as the curing agents.

Although glycidyl nitrate prepolymers have a satisfactory shelf life, it is known that conventionally cured PGN inherently de-cures when subjected to elevated temperatures for prolonged periods. If precautions are not taken, over time cured PGN can de-cure to the point of reverting to a pourable liquid. Accordingly, special care must be taken in the handling and storing of energetic compositions containing crosslinked PGN. The special care required to avoid de-curing problem has impeded the widespread use of PGN as a binder, despite its attractive energetic properties.

One solution to this de-curing problem has been suggested by N. C. Paul et al., *An Improved polyGLYN Binder Through End Group Modification*, ICI Explosives (1998). The article indicates the de-curing problem as being caused by the proximity of the terminal hydroxyl groups of the polymer to nitrate ester groups. The authors conclude that the de-curing problem is an inevitable consequence of the end group structure. To overcome this problem, the article describes a two-step process that modifies the end groups by removing the adjacent nitrate esters and replacing the nitrate ester groups with hydroxyl groups by base-catalyzed hydrolysis. Aging tests have shown that this technique is successful in preventing de-cure of the polymer. However, one of the major drawbacks to this solution of PGN de-curing is the decrease of energetic performance. It is estimated that approximately 10 percent of the nitrate esters may be removed from the polymer chain in accordance with this technique. Another drawback is that the extra chemical process steps cause additional expense and chemical waste in production.

OBJECTS OF THE INVENTION

It is therefore one of the objects of this invention to provide a poly(glycidyl nitrate) (PGN) production process that produces cured PGN having desired stability against de-cure without sacrificing nitrate ester moieties in the production process.

It is also an object of the invention according to another aspect to provide a process for the production of a cured energetic composition wherein the process can yield a cured energetic composition having desirable stability against de-cure without sacrificing nitrate ester moieties in the production process.

Additional objects and advantages of the invention will be set forth in the description that follows, and in part will be apparent from the description, or may be learned by practice of the invention. The objects and advantages of the invention may be realized and obtained by means of the instrumentalities and combinations pointed out in the appended claims.

SUMMARY OF THE INVENTION

To achieve the foregoing objects, and in accordance with the purposes of the invention as embodied and broadly described in this document, a process is provided in accordance with a first aspect of the invention in which at least one multi-functional alcohol having a hydroxyl functionality of at least two is provided as a polymerization initiator. The multi-functional alcohol initiator is optionally, although preferably, reacted with a catalyst to form a catalyst-initiator complex, which is then used in the polymerization of glycidyl nitrate. The resulting poly(glycidyl nitrate) has a functionality substantially equivalent in number to the hydroxyl functionality of the multi-functional alcohol. The poly(glycidyl nitrate) is then either crosslinked or combined into an energetic formulation and subjected to crosslinking. Crosslinking is performed with at least one aromatic polyisocyanate having at least one aromatic ring and, on average, more than two, preferably at least 2.3, isocyanate moieties bonded directly to the aromatic ring. Examples of the aromatic polyisocyanate include PAPI, which is a polyaromatic polyisocyanate also referred to as polymethylenepolyphenylisocyanate or polymeric MDI.

The selection of an aromatic polyisocyanate curative for curing of the multi-functional PGN imparts a high stability against de-cure, especially at elevated temperatures, while not sacrificing the energetic performance contributed by the nitrate ester moieties of the glycidyl nitrate. Further, by selecting a polyisocyanate with, on average, more than two isocyanate moieties (and optionally an initiator having a functionality of greater than 2), crosslinking of the PGN (instead of exclusive chain extension, as in the case of using a difunctional initiator and difunctional curing agent) is attained for enhancing physical properties of the cured binder.

In accordance with another aspect of the invention, a process is provided for the production of a cured energetic composition. The process comprises providing at least one multi-functional alcohol initiator having a hydroxyl functionality of at least two, optionally reacting the multi-functional alcohol initiator with a catalyst to form a catalyst-initiator complex, reacting glycidyl nitrate monomers with the multi-functional alcohol initiator and/or the catalyst-initiator complex to form poly(glycidyl nitrate) having a functionality substantially equal in number to the hydroxyl functionality, preparing an energetic formulation comprising the poly(glycidyl nitrate), and crosslinking the poly(glycidyl nitrate) with at least one aromatic polyisocyanate. The polyisocyanate has at least one aromatic ring and, on average, more than two isocyanate moieties bonded directly to the aromatic ring.

DETAILED DESCRIPTION OF PREFERRED EMBODIMENTS AND METHODS OF THE INVENTION

Reference will now be made in detail to the presently preferred embodiments and methods of the invention as described below. It should be noted, however, that the invention in its broader aspects is not limited to the specific details, representative devices and methods, and examples described in this section in connection with the preferred embodiments and methods. The invention according to its various aspects is particularly pointed out and distinctly claimed in the attached claims read in view of this specification, and appropriate equivalents.

In accordance with one aspect of the invention, a process is provided for the production of poly(glycidyl nitrate). The process comprises providing at least one multi-functional alcohol initiator having a hydroxyl functionality of at least two, preferably between two and four, still more preferably between two and three, although the desired functionality of the alcohol will depend upon the functionality of the polyisocyanate.

The preferred multi-functional alcohol initiator employed generally has at least two sterically unhindered hydroxyl groups, and preferably comprises a liquid at room temperature. Representative diols include, not necessarily by limitation, ethylene glycol, propane diol, butane diol, and other others. An exemplary liquid triol is glycerin. Examples of solid triols are trimethylol propane ((2-ethyl-2-hydroxymethyl)-1,3-propanediol) and butane triol, which may be dissolved in a suitable solvent, such as methylene chloride. Preferably, the initiator has a hydroxyl functionality of two, although triols and tetrols may be used. Tetraols useful in forming tetrafunctional polymers according to this invention have the formula:

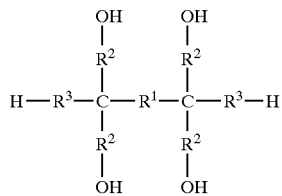

wherein $R^1$ is nothing or a non-polar extender, such as an alkylene, or an ether moiety, especially those having a length of not greater than 3 atoms selected from the group consisting of carbon and oxygen, and is preferably saturated; wherein each $R^2$ is the same or different, and is either nothing or a non-polar extender, such as an alkylene, or an ether moiety, especially those having a length of not greater than 3 atoms selected from the group consisting of carbon and oxygen, and is preferably saturated; and wherein each $R^3$ is the same or different, and is either nothing or a non-polar extender, such as an alkyl, or an ether moiety, especially those having a length of not greater than 3 atoms selected from the group consisting of carbon and oxygen, and (if present) is preferably saturated, more preferably methylene ($-CH_2-$) or ethylene ($-CH_2-CH_2-$).

The tetraol is more preferably diglycerol. Another example of a tetraol is pentaerythritol, which is a solid at room temperature and may be dissolved in, for example, methylene chloride.

The multi-functional alcohol preferably either is a liquid or is a solid having a low melting point of not more than 60° C. The hydroxyl groups of the alcohol are preferably unhindered primary or secondary hydroxyl groups. The molecular weight of the alcohol is relatively low, preferably not more than 500, more preferably not more than 300, and most preferably not more than 180. Diols may have molecular weights of, for example, less than 100.

In accordance with this aspect of the invention, the process optionally but preferably includes reacting the multi-functional alcohol initiator with a catalyst to form a catalyst-initiator complex. The acid catalyst may be used at a low level relative to the hydroxyl groups of the multi-functional alcohol. A much more controlled reaction occurs if the catalyst, such as a Lewis acid, is used at a molar ratio relative to hydroxyl groups of the multi-functional alcohol of less than 1:1, preferably from about 0.4:1 to about 0.8:1, such as 0.5:1. If a protic acid is used as the catalyst, the ratio of hydrogen ions released by the acid catalyst to the hydroxyl groups of the alcohol is also less than 1:1, preferably 0.4:1 to about 0.8:1, such as 0.5:1. By using a low level of acid catalyst, a greater percentage of the hydroxyl moieties can be incorporated internally within the polymer molecules, cyclic oligomer formation can be suppressed to a level of about 2 to 5% or less, and polydispersity ($M_w/M_n$) can be kept lower than 2 (as measured by gel permeation chromatography).

When the selection of the catalyst and multi-functional alcohol initiator results in the formation of alkoxide groups in the catalyst-initiator complex, the resulting PGN products are low in functionality. For example, pre-reacting the multi-functional alcohol and a catalyst such as boron trifluoride etherate, and then optionally removing diethylether under vacuum conditions can produce a PGN product essentially free of alkoxide groups. If, however, the catalyst and initiator would not form products containing alkoxide groups, such as when boron trifluoride gas is employed instead of boron trifluoride etherate, then the step of removing the potential alkoxide may be avoided.

It is preferred that the catalyst and initiator be pre-reacted in the absence of any solvent or water, and that the initiator be pre-dried, for example, with calcium hydride. It has been found that removing water and solvent during formation of the catalyst-initiator complex increases both the monomer incorporation rate and molecular weight of the polymer, and decreases the formation of cyclic oligomers. By suppressing the formation of cyclic oligomers, the functionality of the PGN is made to be substantially equal in number to the functionality of the multi-functional alcohol initiator. Thus, if the functionality of the multi-functional alcohol initiator is three, the functionality in number of the PGN is also preferably about three. Although not intending to be limited by any theory, the use of BF$_3$:THF is preferred because it is believed that the THF (tetrahydrofuran) monomers can be incorporated into the polymer without interrupting its functionality through the generation of non-functional end groups.

Further in accordance with this aspect of the invention, the process includes reacting glycidyl nitrate with at least one member selected from the group consisting of the multi-functional alcohol initiator and the catalyst-initiator complex to form poly(glycidyl nitrate) having a functionality substantially equal in number to the hydroxyl functionality.

The glycidyl nitrate used in the process according to this aspect of the invention is preferably synthesized by nitration of glycerol $CH_2(OH)CH(OH)CH_2(OH)$ to form dinitroglycerin, and ring closure of the dinitroglycerin. Preferably, the nitration is performed with nitric acid, such as 90 weight percent nitric acid, as the nitrating agent. Other nitrating agents, however, may be used, including: mixed acids, such as sulfuric and nitric acids, or acetyl nitrate; nitronium ion salts, such as $NO_2BF_4$, $NO_2ClO_4$, and/or $N_2O_5$; and trifluoroacetic anhydride (TFAA) with ammonium nitrate, nitric acid, and/or Crivello reagents. The molar ratio of nitrating agent to glycerol is preferably in a range of 4:1 to 5:1 for nitric acid.

The nitration of glycerol produces five different compounds: trinitroglycerin (or nitroglycerin), two isomers of mononitroglycerin (α-mononitroglycerin and β-mononitroglycerin), and two isomers of dinitroglycerin (α'-dinitroglycerin and β'-dinitroglycerin).

The cyclization of the dinitroglycerin into glycidyl nitrate may be performed in the presence of an inorganic hydroxide, including alkali metal hydroxides such as sodium hydroxide, potassium hydroxide, and lithium hydroxide. Alkaline earth metals, in particular calcium hydroxide, can also be used. Generally, two molar equivalents of cyclizing agent may be used: the first equivalent for neutralizing the nitric acid, and the second equivalent for cyclization. Although hydrolysis treatment of the nitrated glycerol solution in an alkaline environment converts the dinitroglycerin isomers into glycidyl nitrate, the two mononitroglycerin isomers and the trinitroglycerin do not cyclize into glycidyl nitrate. Rather, the mononitroglycerin isomers are hydrolyzed, thereby solubilizing in the aqueous phase to facilitate removal, separation, and recovery (e.g., by decanting) from the reaction solution at or below room temperature by decanting or the like. Polymerization of the glycidyl nitrate into PGN can be conducted in the presence of the trinitroglycerin without interference. Thus, the trinitroglycerin does not have to be distilled off or otherwise removed prior to polymerization.

In order to increase the yield of glycidyl nitrate from glycerol, the reaction conditions can be and preferably are selected to drive the synthesis of 1,3-dinitroglycerin. Preferably, the nitration reaction is conducted at a relatively low temperature, preferably not higher than room temperature, more preferably 0 to 25° C., and still more preferably 10° C. to 20° C. The reaction typically takes about 4 hours, more commonly a minimum of about 6 hours, due to the low temperature at which the nitration reaction proceeds. Practice of these conditions can result in a dinitroglycerin concentration of at least 50 mole percent, with trinitroglycerin being present in concentrations of less than 20 mole percent, still more preferably less than about 10 mole percent, to satisfy safety concerns.

The nitration step is preferably conducted in the presence of an acceptable heat sink medium, such as an inert halogenated hydrocarbon, such as methylene chloride, chloroform, and/or dichloroethane.

Although preferred glycidyl nitrate monomers for use in the process according to this aspect of the invention are preferably derived from glycerol, it to be understood that conventional synthesis routes may also be used within the scope of this invention. Such conventional synthesis routes include, by way of example, the following: the nitration of epichlorohydrin, followed by the recyclization of the nitrated epichlorohydrin with a base; treatment of glycidol with nitrogen pentoxide $N_2O_5$ in an inert solvent, followed by quenching in an aqueous solution, as described in U.S. Pat. No. 5,136,062; and others.

Polymerization of the glycidyl nitrate occurs as follows:

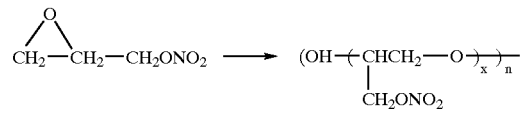

wherein n is an integer essentially equal to the hydroxy functionality of a co-initiator and x is an integer representing the repeating units. In the context of this invention, n is at least about 2. The glycidyl nitrate monomer preferably is added to the catalyst-initiator complex reaction mixture at a rate in which the monomer is used up (reacted) essentially as fast as it is added, and the reaction temperature is preferably maintained at a temperature of about 10° C. to about 25° C.

The polymerization reaction is preferably a cationic polymerization process conducted using a multi-functional co-initiator and an acid catalyst. The acid catalyst may be selected among protic and Lewis acids known in the art, including $BF_3$:THF, $BF_3$, $HBF_4$, $PF_5$, $BF_3$ etherate, as well as other initiators such as triethoxonium salts, such as triethyloxonium hexafluorophosphate, triethoxonium hexafluoroantimonate, and triethoxonium tetrafluoroborate. (The triethoxonium salts and their use is described in U.S. Pat. No. 6,100,375.) $BF_3$:THF (boron trifluoride tetrahydrofuran) is currently preferred.

The cationic polymerization reaction may be carried out in a suitable organic solvent conducive to the cationic polymerization. Suitable solvents that may be used include non-protic, non-ether, inert solvents, including halogenated hydrocarbon solvents, such as methylene chloride, chloroform, and 1,2-dichloroethane.

The polymerization reaction is preferably conducted in a manner whereby the glycidyl nitrate is combined with the reaction mixture at a rate essentially equivalent to its rate of reaction, so that no effective net concentration of monomer is built up in the reaction mixture. Suitable reaction temperature are, for example, within the range of about 10° C. to about 25° C., preferably about 11° C. to about 17° C., and still more preferably about 13° C. to about 15° C.

A more detailed discussion of a method of polymerizing glycidyl nitrate into poly(glycidyl nitrate) is disclosed in U.S. Pat. No. 5,120,827.

Also in accordance with this aspect of the invention, the process includes crosslinking the poly(glycidyl nitrate) with at least one aromatic polyisocyanate having a functionality greater than 2, wherein the aromatic polyisocyanate has at least one aromatic ring and, on average, more than two isocyanate moieties bonded directly to the aromatic ring. More preferably, the functionality of the polyisocyanate is at least 2.3.

The aromatic polyisocyanate may comprise, for example and not necessarily by limitation, PAPI. Where PAPI is selected as the polyisocyanate, the hydroxyl functionality of the initiator is preferably, but not necessarily, two.

In accordance with another aspect of the invention, a process is provided for the production of a cured energetic composition, said process comprises according to this aspect of the invention comprises providing at least one multi-functional alcohol initiator having a hydroxyl functionality of at least two.

In accordance with this aspect of the invention, the process optionally but preferably includes reacting the multi-functional alcohol initiator with a catalyst to form a catalyst-initiator complex. Multi-functional alcohol initiators and catalysts preferred for and suitable for this aspect of the invention include those described above.

The process according to this aspect of the invention further includes reacting glycidyl nitrate with at least one member selected from the group consisting of the multi-functional alcohol initiator and the catalyst-initiator complex to form poly(glycidyl nitrate) having a functionality substantially equal in number to the hydroxyl functionality. This reaction may be and preferably is carried out as described above.

Further in accordance with this aspect of the invention, the process includes crosslinking the poly(glycidyl nitrate) with at least one aromatic polyisocyanate, wherein the aromatic polyisocyanate has at least one aromatic ring and, on average, more than two isocyanate moieties bonded directly to the at least one aromatic ring, i.e., a functionality of more than two. The crosslinking may and preferably is carried out also as described above.

The PGN as obtained through preferred versions of the inventive process can be utilized in explosive compositions without the need for further purification or recrystallization steps. However, after quenching of the PGN with, for example, methanol, it is possible to purify the PGN by removing residual nitroglycerin.

PGN may be used in combination with conventional or novel propellant and solid explosive ingredients as the basis for formulating very high performance insensitive propellant and explosive compositions. Propellant and explosive compositions suitable for use with PGN are disclosed in, for example, U.S. Pat. No. 5,587,553 and U.S. Pat. No. 5,690,868. Techniques for combining PGN into energetic formulations and curing the formulation are well known in the art. Generally, the PGN is mixed with the other ingredients of the explosive composition, including the curative, followed by addition of the cure catalyst. Of course, other sequences for combining ingredients fall within the scope of this invention, and would be apparent to those skilled in the art.

Representative explosive materials that can be made with PGN include gun propellants, cast cure explosives, and extrudable explosives. The explosive (or energetic) materials of this invention are preferably not in the form of a foam.

Generally, a gun propellant may comprise about 15 weight percent to about 40 weight percent of binder and plasticizer (at a plasticizer to binder weight ratio of, for example, 0:1 to 3:1), 0 to 80 weight percent filler, such as nitramine (e.g., RDX, HMX and/or CL-20), and optionally 0.5 weight percent to 5 weight percent ballistic modifiers.

Cast cure explosives in which PGN may be used generally comprise as ingredients 5 weight percent to 20 weight percent PGN binder and optionally other binders, 0.5 weight percent to 3 weight percent curative, 0.25 weight percent to 2 weight percent cure catalyst, and 20 weight percent to 80 weight percent oxidizer. Exemplary oxidizers include ammonium perchlorate and/or ammonium nitrate.

Typically formulations for extrudable explosives include 5 weight percent to 35 weight percent PGN and optionally other binders, 0 to 65 weight percent oxidizer, 0 to 90 weight percent explosive filler, 0 to 40 weight percent metal, and 0 to 25 weight percent plasticizers.

PGN may also be used as a binder for composite propellant compositions, including minimum smoke, reduced smoke, and smoke propellants.

Minimum smoke propellants generally include as ingredients the following: 4 weight percent to 30 weight percent binder, 0.5 weight percent to 3 weight percent curative, 0.25 weight percent to 2 weight percent cure catalyst, 0 weight percent to 80 weight percent solid oxidizer, 0 to 50 weight percent energetic solid filler, and 0 to 30 weight percent plasticizer. Other additives, such as 0 to 5 weight percent ballistic modifiers, may also be added.

Typical formulations for reduced smoke propellants generally are similar to minimum smoke propellants. However, if ammonium perchlorate is selected as a component of the oxidizer and/or aluminum or aluminum oxide is selected as a component of the fuel, the ammonium perchlorate, aluminum, and aluminum oxide are used in sufficiently low amounts to retain the desired reduced smoke properties. Generally, aluminum is present in an amount of not more than 3 weight percent for reduced smoke propellants.

Typical formulations for the smokey propellants generally are similar to those of reduced smoke propellants, but do not contain undue restrictions on the smoke generating components. Thus, aluminum can be used in concentrations as high as about 22 weight percent (or as limited by combustion efficiency) and the ammonium perchlorate can be used in concentrations as high as 80 weight percent (or as limited by theoretical performance) in smokey propellants.

Methods of preparing energetic compositions are generally known in the art, and are set forth in A. Davenas, Solid Rocket Propulsion Technology (1993) and R. Meyer, Explosives ($4^{th}$ ed. 1993).

PGN can be used alone or in combination with other energetic and inert binders, or combinations thereof. Representative inert polymeric binders that can be used in combination with PGN include hydroxy-terminated polybutadiene (HTPB), butadiene-acrylonitrile-acrylic acid terpolymer (PBAN), poly(propylene glycol) (PPG), poly (ethylene glycol) (PEG), polyesters, polyacrylates, polymethacrylates, cellulose acetate butyrate (CAB), and combinations and copolymers thereof Representative energetic polymeric binders that can be used in combination with PGN include poly(nitrato methyl methyl oxetane) (polyNMMO), poly(glycidylazide) (GAP), nitrocellulose (NC), diethyleneglycol-triethyleneglycol-nitraminodiacetic acid terpolymer, poly(bisazidomethyl oxetane) (polyBAMO), poly(azido methyl methyl oxetane) (polyAMMO), poly(nitramino methyl methyl oxetane) (polyNAMMO), copolyBAMO/NMMO, polyBAMO/AMMO, and combinations and copolymers thereof. The binder can optionally be halogenated, such as fluorinated ethylene propylene copolymer, chlorotribluoroethylene and vinylidene fluoride copolymer, polyvinylidene fluoride, polydifluorochloroethylene, fluorinated polyethers, poly (vinyl chloride) (PVC), polytetrafluoroethylene, and combinations thereof.

Representative oxidizers include ammonium perchlorate (AP), ammonium nitrate (AN), hydroxylammonium nitrate (HAN), ammonium dinitramide (ADN), hydrazinium nitroformate (HNF), and mixtures thereof The oxidizer may be present as a powder, particles, and/or in other forms.

Representative reactive metals include aluminum, magnesium, boron, titanium, zirconium, and mixtures thereof. These metals may be present as a powder, particles, and/or in other forms.

Energetic fuels (for propellants) or explosive filler (for explosives and pyrotechnics) that can be used in combination with PGN include the following: nitramines such as 4,10-dinitro-2,6,8,12-tetraoxa-4,10-diazatetracyclo-[$5.5.0.0^{5,9}0^{3,11}$]-dodecane (TEX), 1,3,5-trinitro-1,3,5-triazacyclohexane (RDX), 1,3,5,7-tetranitro-1,3,5,7-tetraazacyclooctane (HMX), and 2,4,6,8,10,12-hexanitro-2,4,6,8,10,12-hexaazatetracyclo[5.5.0.0$^{5,9}$0$^{3,11}$]-dodecane (CL-20 or HNIW); 3-nitro-1,2,4triazol-5-one (NTO); nitroguanidine (NQ), 1,3,5-triamino-2,4,6-trinitrobenzene (TATB), and 1,1-diamino-2,2-dinitroethane (DADNE).

PGN can also be used to prepare high solids (more than about 90% solid ingredients) pressable or extrudable explosives. The pressable or extrudable explosives can also contain one or more inert plasticizers and/or one or more energetic plasticizers. Representative inert plasticizers include dioctyladipate (DOA), isodecylperlargonate (IDP), dioctylphthalate (DOP), dioctylmaleate (DOM), dibutylphthalate (DBP), oleyl nitrile, or combinations thereof. Representative energetic plasticizers include bis(2,2-dinitropropyl)acetal/bis(2,2-dinitropropyl)formal (BDNPF/A), diglycerol tetranitrate (DGTN), trimethylolethanetrinitrate (TMETN), triethyleneglycoldinitrate (TEGDN), diethyleneglycoldinitrate (DEGDN), nitroglycerin (NG), butanetrioltrinitrate (BTTN), alkyl NENA's (nitratoethylnitramine), and combinations thereof.

A list of representative ballistic modifiers include, by way of example, Lewis acids, iron oxide (Fe$_2$O$_3$), bismuth-containing compounds, lead and lead-containing compounds, such as lead salts and organometallic lead compounds.

The following examples are offered to further illustrate the synthesis methods of the present invention. These examples are intended to be exemplary and should not be considered exhaustive of the scope of this invention.

EXAMPLES

Example 1

Preparation of Glycidyl Nitrate

In a one-liter three-neck round bottom flask equipped with a magnetic stirrer, thermometer, additional funnel, and nitrogen sparge line was placed 140 grams of glycerine diluted with an equal volume of methylene chloride. The flask was immersed in a cooling bath. 300 ml of nitric acid (90%) was added while maintaining the temperature of the solution below 25° C. The mixture was allowed to stand with a vigorous nitrogen sparge for 4 to 18 hours. After 1 hour, the isomeric mixture of 1,2-dinitroglycerin and 1,3-dinitroglycerin accounted for 36.3 molar percent of the mixture. This amount of isomeric mixture of dinitroglycerin increased to 39.0 molar percent after 2 hours, 44.5 molar percent after 4 hours, 71.5 molar percent after 5 hours, and 73.8 molar percent after 6 hours. 50 percent sodium hydroxide was then added while cooling to maintain the temperature of the mixture below 25° C. After the mixture was determined to be neutral, additional solid sodium hydroxide (one molar equivalent to the glycerine) was added slowly to maintain the temperature below 25° C. After stirring for 1 to 3 hours at room temperature, the mixture was extracted three times with ether, methylene chloride, or MTBE. The organic phases were combined, dried with magnesium sulfate, filtered and evaporated in vacuo, providing approximately 50 molar percent of pure glycidyl nitrate.

Example 2

Preparation of Glycidyl Nitrate

In a 300 milliter three-neck round bottom flask equipped with a magnetic stirrer, thermometer, additional funnel, and nitrogen sparge line was placed 70 grams of glycerine (0.76 mole) diluted with 50 ml of methylene chloride. The flask was immersed in a cooling bath and cooled to 5° C. 150 ml of nitric acid (90%) was added drop wise over a 30–45 minute period and then stirred at room temperature for 5 to 6 hours. 30% NaOH solution was then added to the nitrated glycerol solution while cooling to maintain the temperature of the mixture below 25° C. After the mixture was determined to have a pH of 14, additional 30% NaOH solution in an amount of 275 grams was added slowly to maintain the temperature below 25° C. The mixture was allowed to stand for about 0.5 hours, then extracted three times with ether. The organic phases were combined, dried with magnesium sulfate, filtered, and evaporated in vacuo, providing approximately 44 grams of pure glycidyl nitrate.

Example 3

Preparation of Glycidyl Nitrate 92 grams of glycerine and 100 ml of methylene chloride were stirred at 0° C. with air bubbling into the reaction mixture and 280 grams of nitric acid added drop wise over 2.5 hours. After addition, the reaction was cooled to −4° C. and left for 16 hours. After this time a solution of 104 grams of sodium hydroxide in 269 ml of water was added, keeping the reaction temperature at 0° C. until the mixture was neutral. At this point, stirring was stopped and two phases separated. The aqueous phase was removed and the colorless organic phase was weighed (128 grams), and shown by nmr to be more than 90 percent purity dinitroglycerine with small amounts of trinitroglycerine, methylene chloride and mono-nitroglycerine. The organic phase was mixed with 65 ml of methylene chloride and an additional 282 grams of 30 percent sodium hydroxide was added over 20 minutes, keeping the reaction at 20–25° C. After addition, the reaction was stirred for an additional 10 minutes before the stirring was stopped and the two liquid phases were allowed to separate. The organic phase was washed once with brine and dried with magnesium sulfate to give 75.3 grams of glycidyl nitrate.

Example 4

Polymerization of Glycidyl Nitrate to PGN

In a three-necked round bottom flask equipped with a nitrogen purge and stirrer, 1.91 grams of trimethylol propane were warmed on a water bath until the trimethylol propane melted and 0.3 gram of calcium hydride was added. This mixture was stirred and allowed to cool and solidify. 3.82 grams of boron trifluoride:tetrahydrafuran were then added and the mixture gently warmed to melt the trimethylol propane and allow the initiator complex to form. The mixture was cooled to room temperature and remained a liquid. 100 grams of glycidyl nitrate in 20 ml of methylene chloride were then added drop wise over 5 hours and left to react for a further 16 hours. At this point, all of the monomer had reacted. The product was diluted with 200 ml of methylene chloride, filtered, and washed with saturated sodium bicarbonate solution. The solvent was then removed under reduced pressure and the resultant viscous amber polymer washed three times with methanol. The last traces of methanol were removed under vacuum at 60° C. to give the pure product. The product had a Mn (by 1H nmr) of 5370.

Example 5

Polymerization of Glycidyl Nitrate to PGN

In a three-necked round bottom flask equipped with a nitrogen purge and stirrer, 12.6 grams of butane diol was stirred with 6.37 grams of boron trifluoride:tetrahydrafuran for 15 minutes. The mixture was cooled to 15° C. and 750 grams of glycidyl nitrate in 750 ml of methylene chloride were then added drop wise over 5. After a further 15 minutes, all of the monomer had reacted. The crude product was washed with 200 ml of saturated sodium bicarbonate solution. The solvent was then removed under reduced pressure and the resultant viscous amber polymer washed three times with methanol. The last traces of methanol were removed under vacuum at 60° C. to give the pure product. The product had a Mn (by 1H nmr) of 4000.

Example 6

Curing of Poly(glycidyl Nitrate)

4.53 grams of difunctional poly(glycidyl nitrate) from Example 5 were mixed with 4.92 grams of butanetriol trinitrate, 0.125 grams of N-methyl nitroaniline, 9.50 grams of aluminum and mixed 1 hour under vacuum. 30.50 grams of ammonium perchlorate were added and the mixture mixed 10 minutes. Then 0.395 grams of PAPI having a functionality of about 2.3 were added and the mixture was mixed 5 minutes. This was followed by 15 minutes of mixing under vacuum. Two drops of dibutyl tin dilaurate was then added and the result was stirred for a final 5 minutes under vacuum. The composition was then cast into a cup and cured at 145° F. for 6 days. The propellant was then kept in an oven at 62.8° C. (145° F.). The shore A hardness of the cured propellant was measured periodically (at room temperature) the results are set forth in the Table below.

| Days at 62.8° C. (145° F.) | Shore A hardness |
|---|---|
| 6 | 60 |
| 13 | 63 |
| 20 | 65 |
| 27 | 65 |
| 41 | 64 |

The Shore A hardness was measured with a standard Shore A gauge manufactured by Zwick & Co. The samples were cut in half, and the Shore A gauge was pressed against the cut, flat surface of the sample. The gauge reading was taken after 10 seconds. This procedure was repeated 3 to 5 times, and the average was recorded.

The foregoing detailed description of the preferred embodiments of the invention has been provided for the purpose of explaining the principles of the invention and its practical application, thereby enabling others skilled in the art to understand the invention for various embodiments and with various modifications as are suited to the particular use contemplated. This description is not intended to be exhaustive or to limit the invention to the precise embodiments disclosed. Modifications and equivalents will be apparent to practitioners skilled in this art and are encompassed within the spirit and scope of the appended claims.

What is claimed is:

1. A process for producing cured poly(glycidyl nitrate), comprising:
    providing at least one multi-functional alcohol initiator having a hydroxyl functionality of at least two;
    reacting the at least one multi-functional alcohol initiator with a catalyst to form a catalyst-initiator complex;
    reacting glycidyl nitrate with the catalyst-initiator complex to form poly(glycidyl nitrate); and
    cross-linking the poly(glycidyl nitrate) with at least one curative comprising at least one aromatic polyisocyanate having a functionality greater than two, the at least one aromatic polyisocyanate having at least one aromatic ring and having, on average, more than two isocyanate moieties bonded directly to the at least one aromatic ring, to form cured poly(glycidyl nitrate) having improved stability against de-cure at elevated temperatures.

2. The process according to claim 1, wherein reacting the gylcidyl nitrate with the catalyst-initiator complex to form the poly(glycidyl nitrate) comprises reacting the glycidyl nitrate with the catalyst-initiator complex to form the poly (glycidyl nitrate) having a functionality substantially equal in number to the hydroxyl functionality of the at least one multi-functional alcohol initiator.

3. The process according to claim 1, wherein providing the at least one multi-functional alcohol initiator having a hydroxyl functionality of at least two comprises providing the at least one multi-functional alcohol initiator which is a liquid at room temperature.

4. The process according to claim 1, wherein the providing the at least one multi-functional alcohol initiator having a hydroxyl functionality of at least two comprises providing the at least one multi-functional alcohol initiator having a hydroxyl functionality of two.

5. The process according to claim 1, wherein providing the at least one multi-functional alcohol initiator having a hydroxyl functionality of at least two comprises providing the at least one multi-functional alcohol initiator having a hydroxyl functionality of three.

6. The process according to claim 1, wherein providing the at least one multi-functional alcohol initiator having a hydroxyl functionality of at least two comprises providing the at least one multi-functional alcohol initiator having a hydroxyl functionality of four.

7. The process according to claim 1, wherein cross-linking the poly(glycidyl nitrate) with the at least one curative comprising the at least one aromatic polyisocyanate having a functionality greater than two comprises cross-linking the poly(glycidyl nitrate) with the at least one curative comprising the at least one aromatic polyisocyanate having a functionality of at least 2.3.

8. The process according to claim 1, further comprising drying the catalyst-initiator complex.

9. The process according to claim 1, further comprising drying the catalyst-initiator complex with calcium hydride.

10. A process for producing a cured energetic composition, comprising:
    providing at least one multi-functional alcohol initiator having a hydroxyl functionality of at least two;
    reacting the at least one multi-functional alcohol initiator with a catalyst to form a catalyst-initiator complex;
    reacting glycidyl nitrate with the catalyst-initiator complex to form poly(glycidyl nitrate);
    preparing an energetic formulation comprising the poly (glycidyl nitrate); and
    cross-linking the energetic formulation comprising the poly(glycidyl nitrate) with at least one curative comprising at least one aromatic polyisocyanate, the at least one aromatic polyisocyanate having at least one aromatic ring and, on average, more than two isocyanate moieties bonded directly to the at least one aromatic ring, to form a cured energetic composition having improved stability against de-cure at elevated temperatures.

11. The process according to claim 10, wherein reacting the glycidyl nitrate with the catalyst-initiator complex to form the poly(glycidyl nitrate) comprises reacting the glycidyl nitrate with the catalyst-initiator complex to form the poly(glycidyl nitrate) having a functionality substantially equal in number to the hydroxyl functionality of the at least one multi-functional alcohol initiator.

12. The process according to claim 10, wherein providing the at least one multi-functional alcohol initiator having a hydroxyl functionality of at least two comprises providing the at least one multi-functional alcohol initiator which is a liquid at room temperature.

13. The process according to claim 10, wherein providing the at least one multi-functional alcohol initiator having a hydroxyl functionality of at least two comprises providing the at least one multi-functional alcohol initiator having a hydroxyl functionality of two.

14. The process according to claim 10, wherein providing the at least one multi-functional alcohol initiator having a hydroxyl functionality of at least two comprises providing the at least one multi-functional alcohol initiator having a hydroxyl functionality of three.

15. The process according to claim 10, wherein providing the at least one multi-functional alcohol initiator having a hydroxyl functionality of at least two comprises providing the at least one multi-functional alcohol initiator having a hydroxyl functionality of four.

16. The process according to claim 10, wherein the cross-linking the energetic formulation comprising the poly(glycidyl nitrate) with the at least one curative comprising the at least one aromatic polyisocyanate comprises cross-linking the energetic formulation comprising the poly(glycidyl nitrate) with the at least one curative comprising the at least one aromatic polyisocyanate having a functionality of at least 2.3.

17. The process according to claim 10, further comprising drying the catalyst-initiator complex.

18. The process according to claim 10, further comprising drying the catalyst-initiator complex with calcium hydride.

19. The process according to claim 10, wherein preparing an energetic formulation comprising the poly(glycidyl nitrate) comprises preparing an energetic formulation which is a gun propellant comprising 15.0 weight percent to 40.0 weight percent of the poly(glycidyl nitrate) and at least one plasticizer, up to 80.0 weight percent of at least one energetic filler, and 0.5 weight percent to 5.0 weight percent of at least one ballistic modifier.

20. The process according to claim 10, wherein preparing an energetic formulation comprising the poly(glycidyl nitrate) comprises preparing an energetic formulation which is a cast cure explosive comprising 5.0 weight percent to 20.0 weight percent of the poly(glycidyl nitrate), 0.5 weight percent to 3.0 weight percent of the at least one aromatic polyisocyanate, and 20.0 weight percent to 80.0 weight percent of at least one oxidizer.

21. The process according to claim 10, wherein preparing an energetic formulation comprising the poly(glycidyl nitrate) comprises preparing an energetic formulation which is a minimum smoke propellant comprising 4.0 weight percent to 30.0 weight percent of the poly(glycidyl nitrate), 0.5 weight percent to 3.0 weight percent of the at least one aromatic polyisocyanate, 0.25 weight percent to 2.0 weight percent of at least one cure catalyst, 0.0 weight percent to 80.0 weight percent of at least one solid oxidizer, 0.0 weight percent to 50.0 weight percent of at least one energetic solid filler, and 0.0 weight percent to 30.0 weight percent of at least one plasticizer.

22. The process according to claim 10, wherein preparing an energetic formulation comprising the poly(glycidyl nitrate) comprises preparing an energetic formulation which is a rocket motor propellant, and wherein at least 3.0 weight percent of the energetic formulation consists of at least one member selected from the group consisting of aluminum and aluminum oxide.

23. The process according to claim 10, wherein the energetic formulation further comprises at least one metal selected from the group consisting of aluminum, magnesium, boron, titanium, and zirconium.

24. A process for producing cured poly(glycidyl nitrate), comprising:
  providing at least one multi-functional alcohol initiator having a hydroxyl functionality of at least two;
  reacting glycidyl nitrate with the at least one multi-functional alcohol initiator to form poly(glycidyl nitrate); and
  cross-linking the poly(glycidyl nitrate) with at least one curative comprising at least one aromatic polyisocyanate having a functionality greater than two, the at least one aromatic ppolyisocyanate having at least one aromatic ring and having, on average, more than two isocyanate moieties bonded directly to the at least one aromatic ring, to form cured poly(gylcidyl nitrate) having improved stability against de-cure at elevated temperatures.

25. The process according to claim 24, wherein reacting the glycidyl nitrate with the at least one multi-functional alcohol initiator to form the poly(glycidyl nitrate) comprises reacting the glycidyl nitrate with the at least one multi-functional alcohol initiator to form the poly(glycidyl nitrate) having a functionality substantially equal in number to the hydroxyl functionality of the at least one multi-functional alcohol initiator.

26. The process according to claim 24, wherein providing the at least one multi-functional alcohol initiator having a hydroxyl functionality of at least two comprises providing the at least one multi-functional alcohol initiator which is a liquid at room temperature.

27. The process according to claim 24, wherein providing the at least one multi-functional alcohol initiator having a hydroxyl functionality of at least two comprises providing the at least one multi-functional alcohol initiator having a hydroxyl functionality of two.

28. The process according to claim 24, wherein providing the at least one multi-functional alcohol initiator having a hydroxyl functionality of at least two comprises providing the at least one multi-functional alcohol initiator having a hydroxyl functionality of three.

29. The process according to claim 24, wherein providing the at least one multi-functional alcohol initiator having a hydroxyl functionality of at least two comprises providing the at least one multi-functional alcohol initiator having a hydroxyl functionality of four.

30. The process according to claim 24, wherein cross-linking the poly(glycidyl nitrate) with the at least one curative comprising the at least one aromatic polyisocyanate having a functionality greater than two comprises cross-linking the poly(glycidyl nitrate) with the at least one curative comprising the at least one aromatic polyisocyanate having a functionality of at least 2.3.

31. A process for producing a cured energetic composition, comprising:
  providing at least one multi-functional alcohol initiator having a hydroxyl functionality of at least two;
  reacting glycidyl nitrate with the at least one multi-functional alcohol initiator to form poly(glycidyl nitrate);

preparing an energetic formulation comprising the poly(glycidyl nitrate); and cross-linking the energetic formulation comprising the poly(glycidyl nitrate) with at least one curative comprising at least one aromatic polyisocyanate, the at least one aromatic polyisocyanate having at least one aromatic ring and, on average, more than two isocyanate moieties bonded directly to the at least one aromatic ring, to form a cured energetic composition having improved stability against de-cure at elevated temperatures.

32. The process according to claim 31, wherein reacting the glycidyl nitrate with the at least one multi-functional alcohol initiator to form the poly(glycidyl nitrate) comprises reacting the glycidyl nitrate with the at least one multi-functional alcohol initiator to form the poly(glycidyl nitrate) having a functionality substantially equal in number to the hydroxyl functionality of the at least one multi-functional alcohol initiator.

33. The process according to claim 31, wherein providing the at least one multi-functional alcohol initiator having a hydroxyl functionality of at least two comprises providing the at least one multi-funcitional alcohol initiator which is a liquid at room temperature.

34. The process according to claim 31, wherein providing the at least one multi-functional alcohol initiator having a hydroxyl functionality of at least two comprises providing the at least one multi-functional alcohol initiator having a hydroxyl functionality of two.

35. The process according to claim 31, wherein providing the at least one multi-functional alcohol initiator having a hydroxyl functionality of at least two comprises providing the at least one multi-functional alcohol initiator having a hydroxyl functionality of three.

36. The process according to claim 31, wherein providing the at least one multi-functional alcohol initiator having a hydroxyl functionality of at least two comprises providing the at least one multi-functional alcohol initiator having a hydroxyl functionality of four.

37. The process according to claim 31, wherein cross-linking the energetic formulation comprising the poly(glycidyl nitrate) with the at least one curative comprising the at least one aromatic polyisocyanate comprises cross-linking the energetic formulation comprising the poly(glycidyl nitrate) with the at least one curative comprising the at least one aromatic polyisocyanate having a functionality of at least 2.3.

38. The process according to claim 31, wherein preparing an energetic formulation comprising the poly(glycidyl nitrate) comprises preparing an energetic formulation which is a gun propellant comprising between 15.0 weight percent and 40.0 weight percent of the poly(glycidyl nitrate) and at least one plasticizer, between 0.0 weight percent and 80.0 weight percent of at least one energetic filler, and between 0.5 weight percent and 5.0 weight percent of at least one ballistic modifier.

39. The process according to claim 31, wherein preparing an energetic formulation comprising the poly(glycidyl nitrate) comprises preparing an energetic formulation which is a cast cure explosive comprising between 5.0 weight percent and 20.0 weight percent of the poly(glycidyl nitrate), between 0.5 weight percent and 3.0 weight percent of the at least one aromatic polyisocyanate, and between 20.0 weight percent and 80.0 weight percent of at least one oxidizer.

40. The process according to claim 31, wherein preparing an energetic formulation comprising the poly(glycidyl nitrate) comprises preparing an energetic formulation which is a minimum smoke propellant comprising between 4.0 weight percent and 30.0 weight percent of the poly(glycidyl nitrate), between 0.5 weight percent and 3.0 weight percent of the at least one aromatic polyisocyanate, between 0.0 percent and 80.0 weight percent of at least one solid oxidizer, between 0.0 weight percent and 50.0 weight percent of at least one energetic solid filler, and between 0.0 weight percent and 30.0 weight percent of at least one plasticizer.

41. The process according to claim 31, wherein preparing an energetic formulation comprising the ply(glycidyl nitrate) comprises preparing an energetic formulation which is a rocket motor propellant, and wherein at least 3.0 weight percent of the energetic formulation consists of at least one member selected from the group consisting of aluminum and aluminum oxide.

42. The process according to claim 31, wherein the energetic formulation further comprises at least one metal selected from the group consisting of aluminum, magnesium, boron, titanium, and zirconium.

* * * * *